(12) United States Patent
Moon et al.

(10) Patent No.: US 11,417,132 B2
(45) Date of Patent: Aug. 16, 2022

(54) IDENTIFICATION OF LOGICAL STARTING LOCATION FOR SCREEN READER

(71) Applicant: Microsoft Technology Licensing, LLC, Redmond, WA (US)

(72) Inventors: Mariah Sigourney Moon, Seattle, WA (US); Zhaoyu Li, Redmond, WA (US); Lukasz Zygmunt Makar, Bellevue, WA (US); Matthew Walker Campbell, Bellevue, WA (US); Ravi Gupta, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 311 days.

(21) Appl. No.: 16/558,114

(22) Filed: Sep. 1, 2019

(65) Prior Publication Data
US 2020/0380255 A1     Dec. 3, 2020

Related U.S. Application Data

(60) Provisional application No. 62/854,707, filed on May 30, 2019.

(51) Int. Cl.
*G06F 16/957* (2019.01)
*G06F 3/16* (2006.01)
(Continued)

(52) U.S. Cl.
CPC .............. *G06V 30/416* (2022.01); *G06F 3/16* (2013.01); *G06F 16/9574* (2019.01); *G06V 30/413* (2022.01); *G09B 21/006* (2013.01)

(58) Field of Classification Search
CPC .... G06F 3/16; G06F 16/9574; G06F 16/9577; G06K 9/00469; G06Q 10/107; G06V 30/416; G06V 30/413; G09B 21/006
See application file for complete search history.

(56) References Cited

U.S. PATENT DOCUMENTS 8,918,718 B2 * 12/2014 Burgess ............... G09B 17/003
                                                         434/179
10,423,703 B1 * 9/2019 Singh .................... G06F 40/169
(Continued)

OTHER PUBLICATIONS

"Volcano—Wikipedia", Retrieved from: https://en.wikipedia.org/wiki/Volcano, Retrieved Date: Aug. 20, 2019, 17 Pages.
(Continued)

*Primary Examiner* — Scott T Baderman
*Assistant Examiner* — Mario M Velez-Lopez
(74) *Attorney, Agent, or Firm* — Rainier Patents, P.S.

(57) ABSTRACT

Described herein are systems and methods for determining a logical starting location to start providing (e.g., reading) content to a user. When the user navigates to a particular web page and/or email message, a screen reader can automatically read content associated with the web page and/or email message beginning at the determined logical starting location. A heuristic can be applied in order to determine the logical starting location. The heuristic can analyze information regarding user interface element(s) (e.g., property(ies) and/or attribute(s)) of the particular webpage and/or email message to find a logical location to start reading once the webpage and/or email message have loaded.

20 Claims, 7 Drawing Sheets

(51) Int. Cl.
*G06V 30/416* (2022.01)
*G09B 21/00* (2006.01)
*G06V 30/413* (2022.01)

(56) References Cited

U.S. PATENT DOCUMENTS

| | | | | |
|---|---|---|---|---|
| 2003/0172353 | A1* | 9/2003 | Cragun | G10L 13/08 |
| | | | | 704/E13.011 |
| 2011/0119571 | A1* | 5/2011 | Decker | G06F 16/9577 |
| | | | | 715/205 |
| 2015/0128022 | A1* | 5/2015 | Hong | G06F 16/9032 |
| | | | | 715/234 |
| 2015/0339049 | A1* | 11/2015 | Kasemset | G06F 3/167 |
| | | | | 715/728 |
| 2018/0181549 | A1* | 6/2018 | Hileman | G06F 40/106 |
| 2021/0097134 | A1* | 4/2021 | Livshits | G06F 40/197 |

OTHER PUBLICATIONS

"JAWS 14 New Features, Part Two—Flexible Web", Retrieved from: https://doccenter.freedomscientific.com/doccenter/doccenter/rs25c51746a0cc/2012-10-24_WhatIsNewJAWS14-L2/02_JAWS14-NewFeatures-L2.htm, Retrieved Date: Aug. 20, 2019, 8 Pages.

"International Search Report and Written Opinion Issued in PCT Application No. PCT/US20/030577", dated Aug. 17, 2020, 13 Pages.

* cited by examiner

IDENTIFICATION OF LOGICAL STARTING LOCATION FOR SCREEN READER

RELATED APPLICATION(S)

This application claims priority to U.S. Provisional Application No. 62/854,707, filed May 30, 2019, entitled "Identification of Logical Starting Location for Screen Reader", the disclosure of which is hereby incorporated by reference herein in its entirety.

BACKGROUND

Screen reader(s) can verbally provide information regarding object(s) (e.g., content) displayed to a user. The information provided can assist visually impaired user(s) to understand and/or navigate displayed content. For example, the screen reader can read text to the user and/or verbally provide information regarding control(s) and/or other object(s) that are being displayed. User(s) can interact with the screen reader, for example, using pre-defined key(s) of a keyboard and/or via other user input device(s).

SUMMARY

Described herein is a system for determining a logical starting location to provide content, comprising: a processing system comprising a processor and a memory having computer-executable instructions stored thereupon which, when executed by the processor, cause the processing system to: receive at least one of a web page or an email message comprising displayed content; receive information regarding user interface elements associated with the at least one of the web page or the email message; analyze the information regarding user interface elements, and, content of the at least one of the web page or email message to determine a logical starting location to begin reading the content; and start to read the content at the determined logical starting location.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
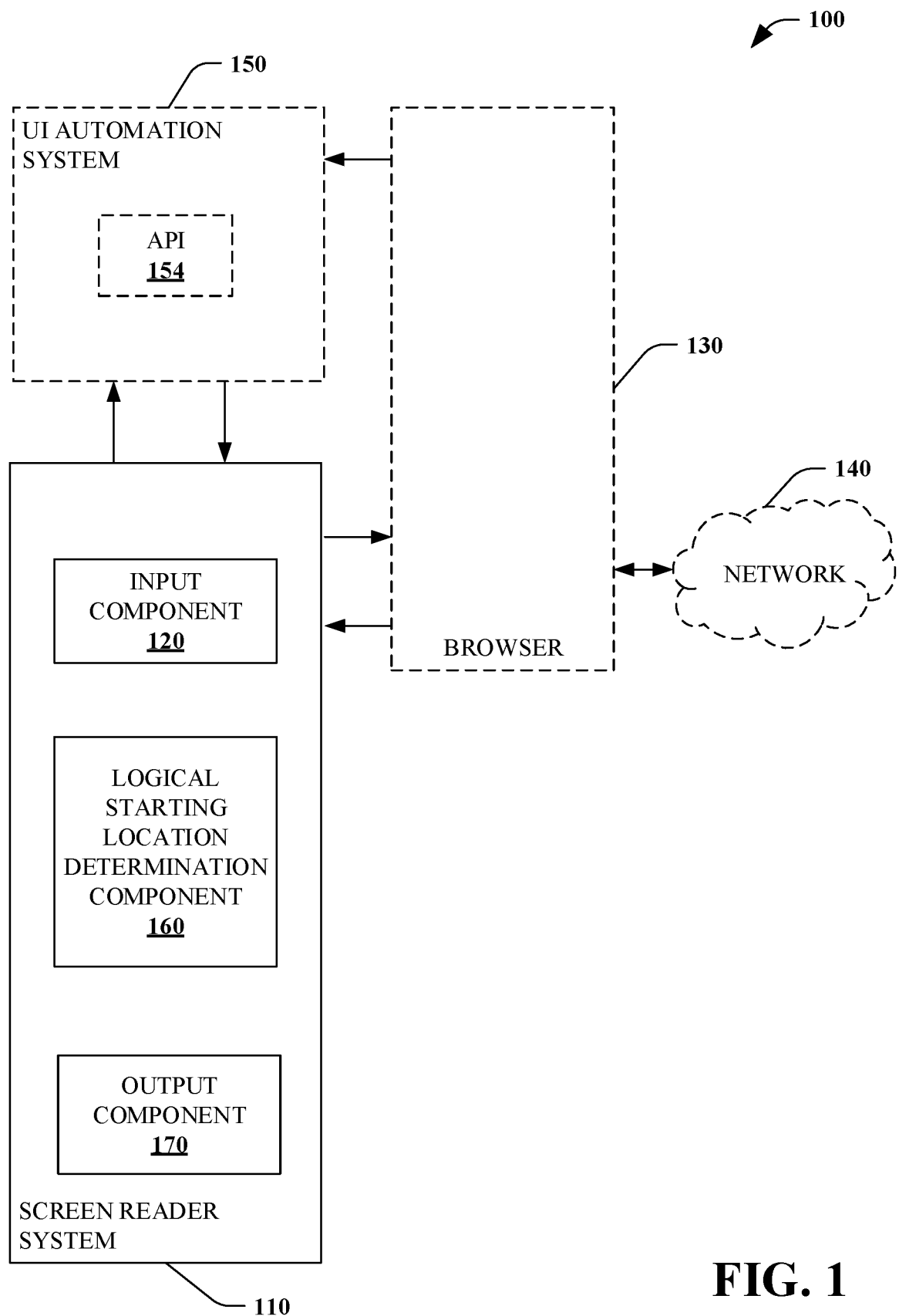
FIG. 1 is a functional block diagram that illustrates a system for determining a logical starting location to provide content.

Various technologies pertaining to identification and/or use of a logical starting point for a screen reader are now described with reference to the drawings, wherein like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

The subject disclosure supports various products and processes that perform, or are configured to perform, various actions regarding identification and/or use of a logical starting point for a screen reader. What follows are one or more exemplary systems and methods.

Aspects of the subject disclosure pertain to the technical problem of identifying a logical starting point for a screen reader for specific content (e.g., particular web page and/or email message). The technical features associated with addressing this problem involve receiving a web page and/or email message comprising displayed content; receiving information regarding user interface elements associated with the web page and/or email message; analyzing the information regarding user interface elements, and, content of the web page and/or email message to determine a logical starting location to begin reading the content; and starting to read the content at the determined logical starting location. Accordingly, aspects of these technical features exhibit technical effects of more efficiently and effectively providing identifying and using a logical starting point for reading content of a web page or email to a user, for example, reducing consumption of computer resource(s) and/or bandwidth.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

As used herein, the terms "component" and "system," as well as various forms thereof (e.g., components, systems, sub-systems, etc.) are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers. Further, as used herein, the term "exemplary" is intended to mean serving as an illustration or example of something, and is not intended to indicate a preference.

Many web sites are designed with navigation control(s), for example, along the top and/or left-hand side to assist user(s) in navigation. This can be problematic for user(s) employing a screen reader which in many cases will read the control(s) to the user before reaching the valuable content within the web page and/or email message.

Described herein are systems and methods for determining a logical starting location to start providing (e.g., reading) content to a user. In this manner, when the user navigates to a particular web page, and/or email message the screen reader can automatically read content associated with the web page and/or email message beginning at the determined logical starting location.

In some embodiments, a heuristic is applied in order to determine the logical starting location. For example, the heuristic can analyze information regarding user interface element(s) (e.g., property(ies) and/or attribute(s)) of the particular web page and/or email message to find a logical location to start reading once the web page and/or email message has loaded. This can allow user(s) to be much more efficient when web page(s) and/or email message are read because the user(s) can get to the most valuable content quickly.

For purposes of explanation and not limitation, the systems and methods are described in the context of navigation to a particular web site using a browser. However, in some embodiments, the systems and methods can be utilized when opening or navigating to a particular email message with an email application.

Referring to FIG. 1, a system for determining a logical starting location to provide content 100 is illustrated. The system 100 includes a screen reader system 110 comprising an input component 120 that receives user input for interaction with the screen reader system 110. For example, the received input can comprise a keyboard command comprising one or more keys.

In some embodiments, a user requests a browser 130 to navigate to a particular web site and load an associated web page (e.g., HTML web page). The browser 130 can obtain the web page from a network 140 (e.g., the Internet) and load the web page. The browser 130 can further place a user interface (UI) focus on the web page (e.g., display the web page).

The screen reader system 110 can request content of the web page from the browser 130 which can obtain the web page from a network 140 (e.g., the Internet). The browser 130 can display the web page to the user and provide information regarding the web page (e.g., HTML web page) to the screen reader system 110. The browser 130 can further provide information regarding the web page to a user interface automation system 150 that allows access to, identification of, and/or manipulation of user interface (UI) element(s) of the web browser, for example, through an application programming interface 154 (e.g., Microsoft® UI Automation API). In some embodiments, the application programming interface 154 can allow access to, identification of, and/or manipulation of user interface (UI) element(s) of an email application.

In some embodiments, the web page is displayed to the user by the browser 130, information provided to the screen reader system 110, and, information provided to the user interface automation system 150 substantially in parallel. In some embodiments, information is provided to the screen reader system 110 and/or the user interface automation system 150 before the web page is displayed to the user by the browser 130.

The screen reader system 110 further includes a logical starting location determination component 160 that receives the web page to be displayed from the browser 130. The logical starting location determination component 160 further obtains information regarding user interface (UI) element(s) associated with the web page (e.g., property(ies) and/or attribute(s)) from the user interface automation system 150. The logical starting location determination component 160 can analyze the information regarding user interface element(s), and/or, content of the web page (e.g., text, image(s)) to determine a logical starting location to begin providing (e.g., reading) the content.

In some embodiments, the logical starting location determination component 160 applies a heuristic to the information regarding UI element(s) received from the UI automation system 150, and/or, the content of the web page (e.g., received from the browser 130). In some embodiments, the heuristic starts by looking for a "main" landmark in the web page (e.g., "<main>" HTML element). If the web page does not include a "main" landmark, the logical starting location determination component 160 then finds a first paragraph that does not have greater than a pre-defined quantity of hyperlinks (e.g., four) right next to one another (e.g., adjacent horizontally and/or adjacent vertically) and has a heading above the first paragraph. The logical starting location determination component 160 can determine the heading above the first paragraph as the logical starting location. That is, the screen reader system 110 will start reading at that heading. If there is no heading, the screen reader system 100 will start reading at that paragraph. In this manner, reading of navigation link(s) can be minimized or prevented, thus decreasing user frustration with the screen reading experience.

In some embodiments, the logical starting location determination component 160 identifies a first text block of the web page with a pre-determined quantity of characters (e.g., more than forty characters) or a first paragraph of content on the web page as the logical starting location.

The screen reader system 110 further includes an output component 170 that provides (e.g., reads) content starting at the determined logical starting location.

Figure 2:
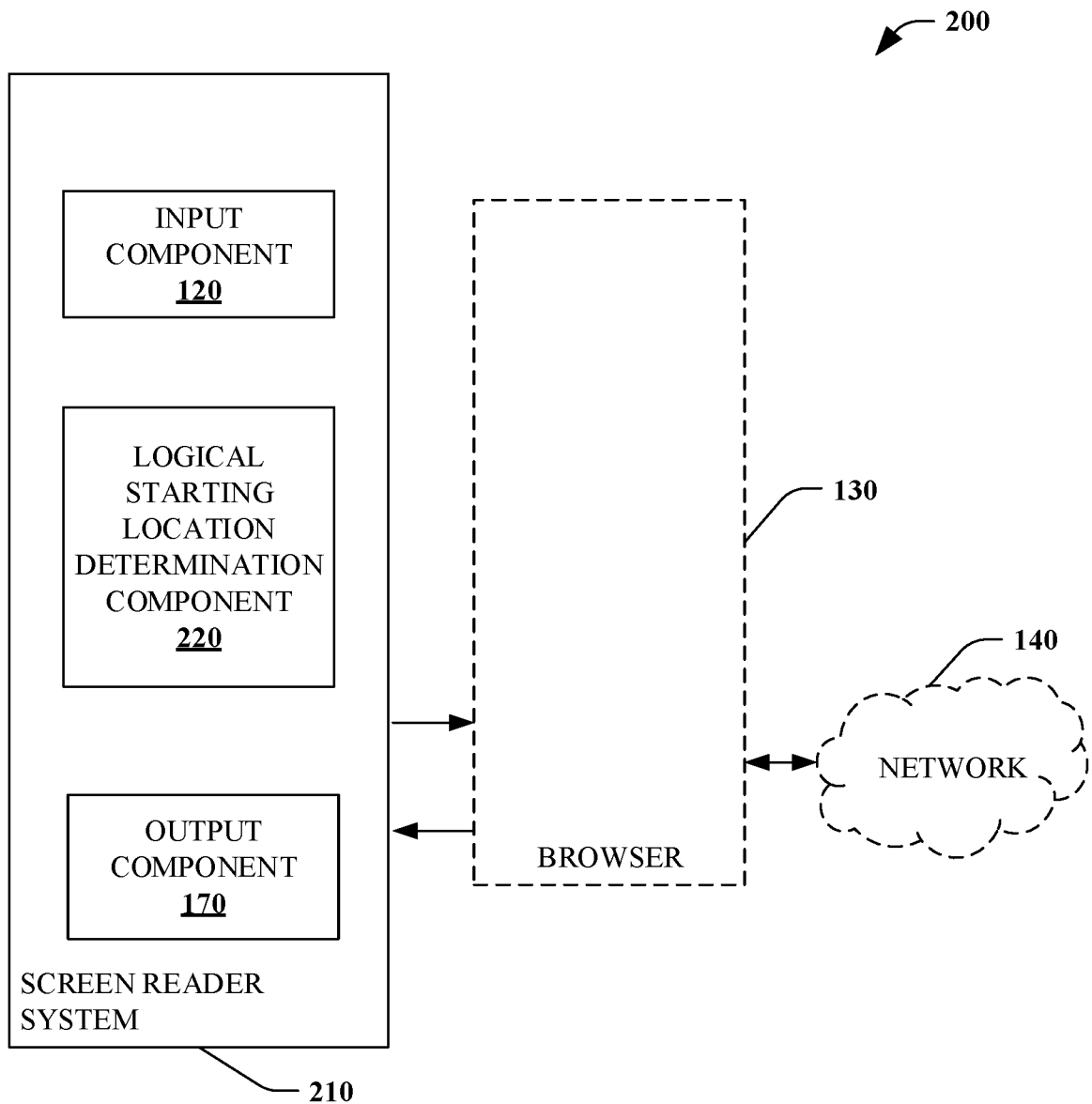
FIG. 2 is a functional block diagram that illustrates a system for determining a logical starting location to provide content.

Turning to FIG. 2, a system for determining a logical starting location to provide content 200 is illustrated. The system 200 includes a screen reader system 210 having an input component 120, an output component 170, and, a logical starting location determination component 220.

The input component 120 receives input from a user requesting to navigate to a particular web site and load an associated web page (e.g., HTML web page). In response to the request, the logical starting location determination component 220 can receive a particular web page from a browser 130. The particular web page comprise content to be displayed.

In some embodiments, the logical starting location determination component 220 can further receive information regarding a "reading view" associated with the particular web page from the browser. "Reading view" refers to a view of the particular web page accessible via the browser 130 in which element(s) determined to be extraneous such as advertisement, image(s), navigation control(s), and the like have been removed, simplifying viewing of content of the particular web page. In some embodiments, the information received regarding the "reading view" can comprises a pre-defined quantity of character(s) and/or word(s) which define a starting point of content of the particular web page in "reading view". The logical starting location determination 220 can map (e.g., match) the information to the displayed web page and utilize a corresponding location in the displayed web page as the determined logical starting point to begin reading the content (e.g., without displaying the particular web page in "reading view"). In this manner, extraneous such as advertisement, image(s), navigation control(s), and the like can be skipped by the screen reader system 210.

In some embodiments, the logical starting location determination component 220 can instantiate a hidden "reviewing view" window (e.g., not viewable and/or accessible by a user). From the hidden "reviewing view" window, the logical starting location determination component 220 can identify a pre-defined quantity of character(s) and/or word(s) which define a starting point of content of the particular web page in "reading view". The logical starting location determination 220 can map (e.g., match) the information and utilize a corresponding location in the displayed web page as the determined logical starting point to begin reading the content (e.g., without displaying the particular web page in "reading view").

FIGS. 3-6 illustrate exemplary methodologies relating to determining a logical starting location to provide content. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium, displayed on a display device, and/or the like.

Figure 3:
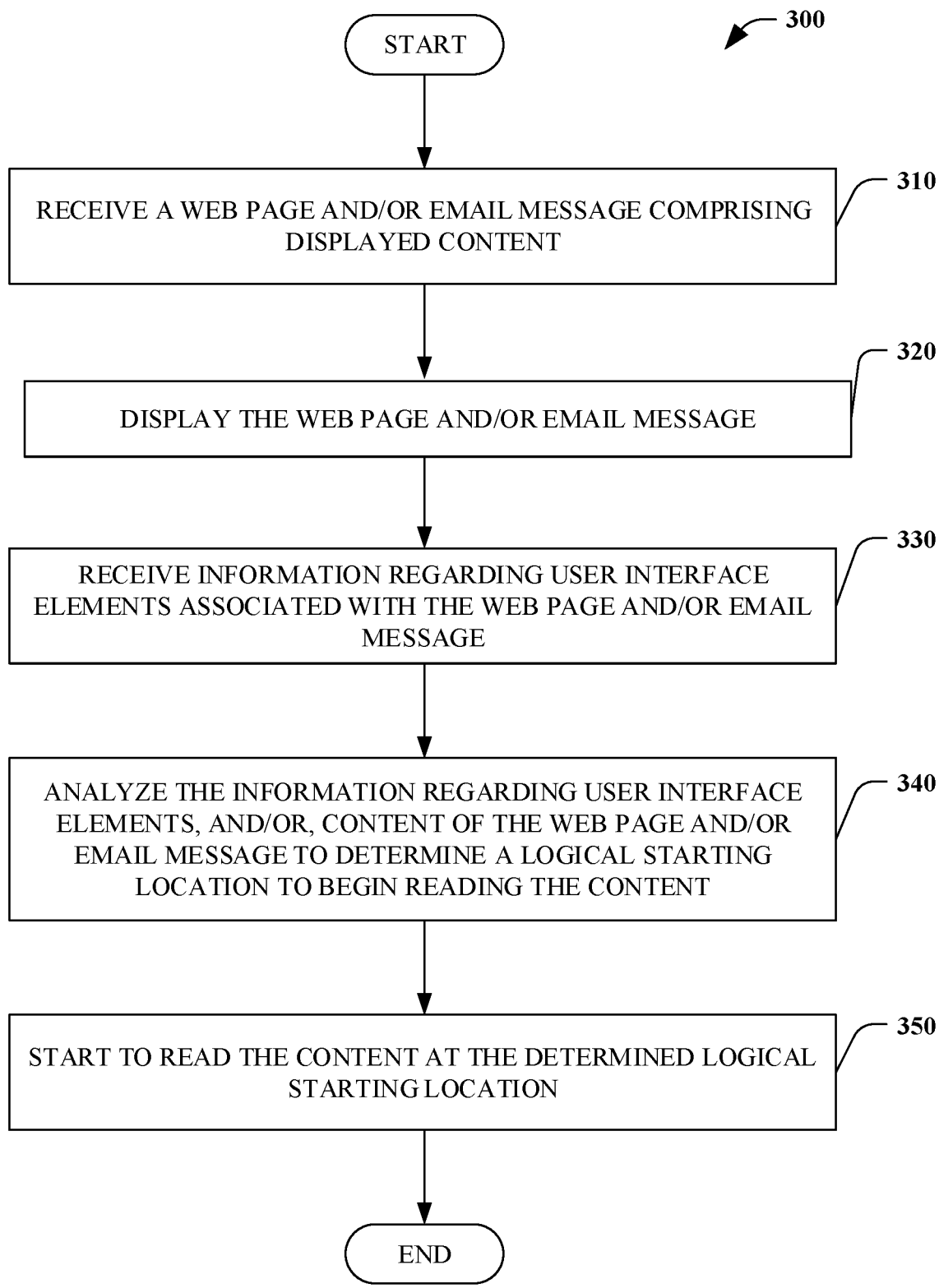
FIG. 3 is a flow chart a method of determining a logical starting location to provide content.

Referring to FIG. 3, a method of determining a logical starting location to provide content 300 is illustrated. In some embodiments, the method 300 is performed by the system 100. At 310, a web page and/or email message is received (e.g., from a browser 130) comprising displayed content. At 320, the web page and/or email message is displayed (e.g., by the browser 130). The browser can obtain the web page from a network (e.g., the Internet) and load the web page. The browser can further place a user interface (UI) focus on the web page (e.g., display the web page).

At 330, information regarding user interface elements (e.g., attribute(s) and/or property(ies)) is received (e.g., from an API 154 of a UI automation system 150). At 340, the information regarding user interface elements, and/or, content of the web page and/or email message are analyzed to determine a logical starting location to begin reading the content (e.g., by the logical starting location determination component 160). At 350, the content is read beginning at the determined logical starting location.

Figure 4:
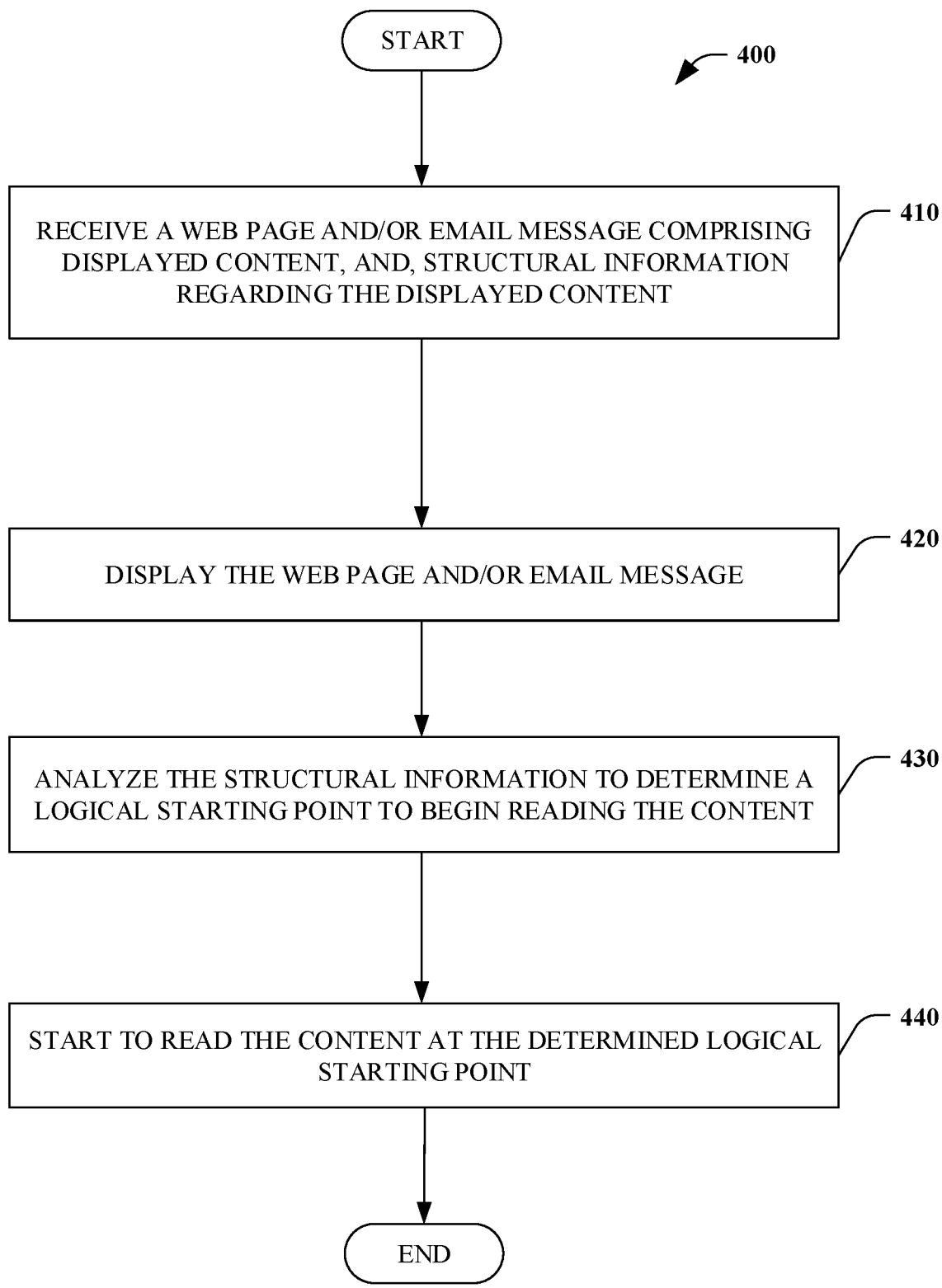
FIG. 4 is a flow chart a method of determining a logical starting location to provide content.

Turning to FIG. 4 a method of determining a logical starting location to provide content 400 is illustrated. In some embodiments, the method 400 is performed by the system 100 and/or the system 200.

At 410, a web page and/or email message comprising displayed content, and, structural information regarding the displayed content is received. At 420, the web page and/or email message is displayed (e.g., by a browser and/or email application).

At 430, the structural information is analyzed to determine a logical starting point to begin reading the content. At 440, the content is read beginning at the determined logical starting location.

Figure 5:
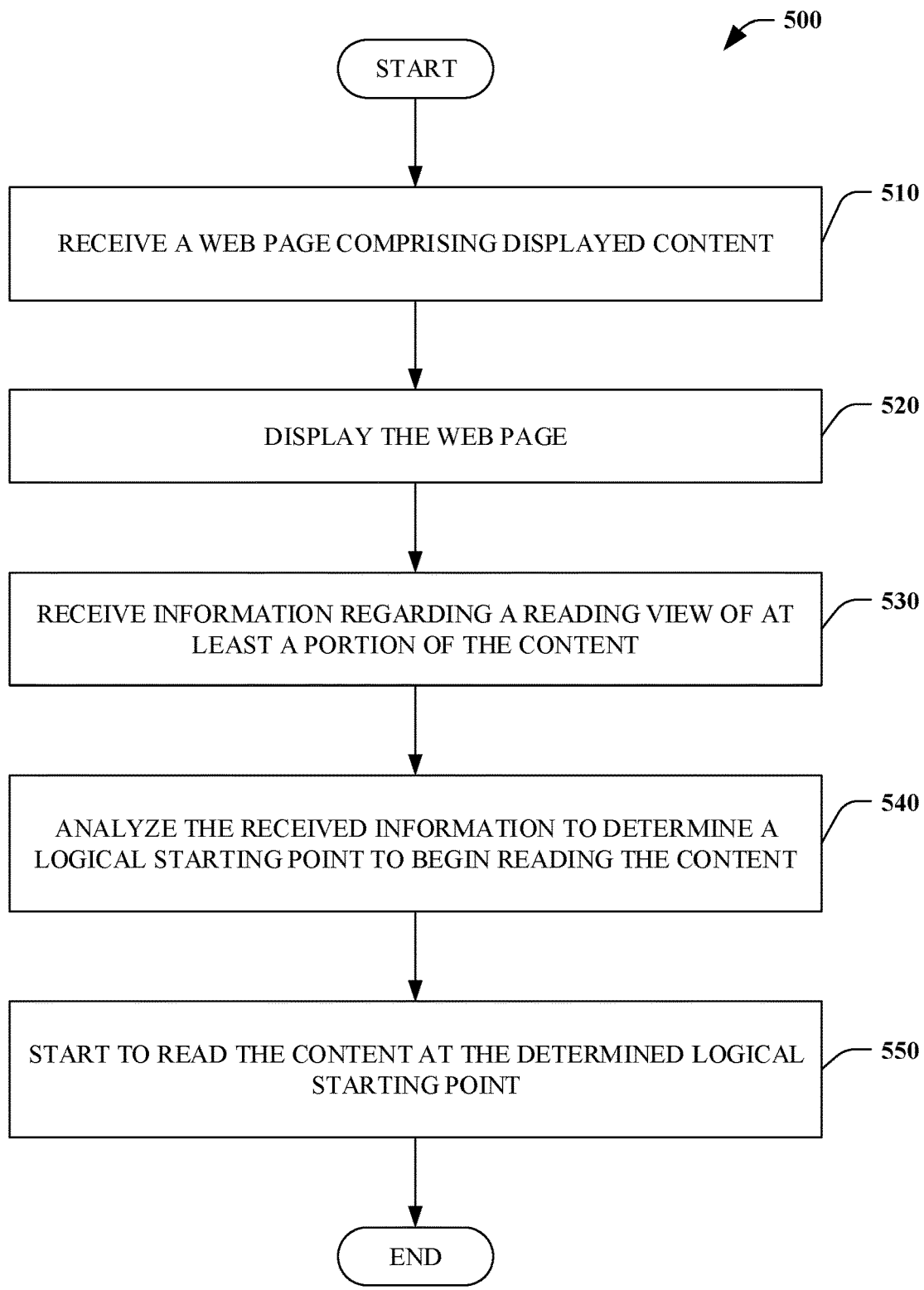
FIG. 5 is a flow chart a method of determining a logical starting location to provide content.

Referring next to FIG. 5, a method of determining a logical starting location to provide content 500 is illustrated. In some embodiments, the method 500 is performed by the system 200.

At 510, a web page comprising displayed content is received (e.g., from a browser 130). At 520, the web page is displayed (e.g., by the browser 130).

At 530, information regarding a reading view of at least a portion of the content is received. At 540, the received information is analyzed to determine a logical starting point to begin reading the content. At 550, the content is read beginning at the determined logical starting location.

Figure 6:
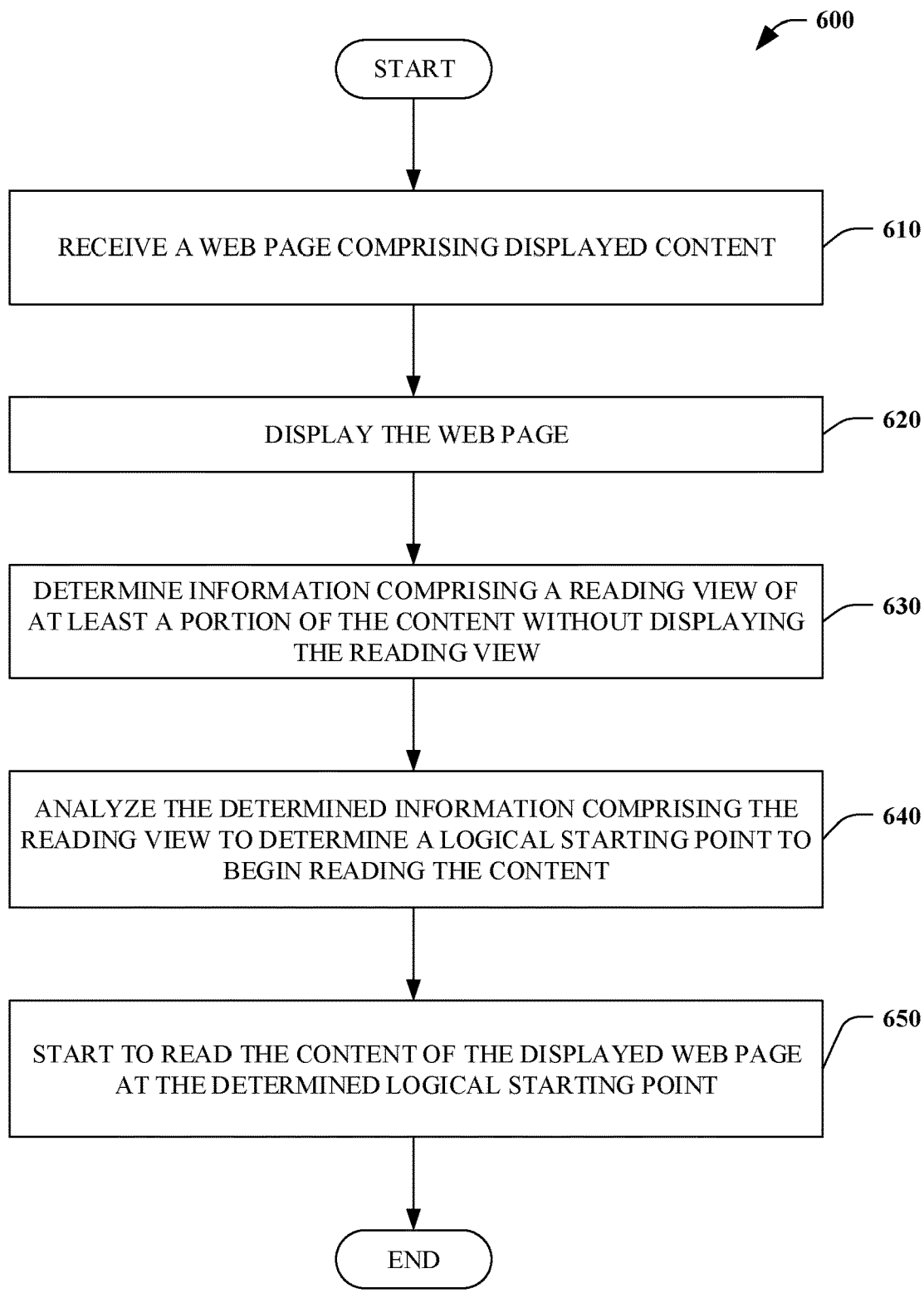
FIG. 6 is a flow chart a method of determining a logical starting location to provide content.

Turning to FIG. 6, a method of determining a logical starting location to provide content 600 is illustrated. In some embodiments, the method 600 is performed by the system 200.

At 610, a web page comprising displayed content is received. At 620, the web page is displayed (e.g., by a browser).

At 630, information comprising a reading view of at least a portion of the content is determined (e.g., without displaying the reading view). At 640, the determined information comprising the reading view is analyzed to determine a logical starting point to begin reading the content. At 650, the content is read beginning at the determined logical starting location.

Described herein is a system for determining a logical starting location to provide content, comprising: a processing system comprising a processor and a memory having computer-executable instructions stored thereupon which, when executed by the processor, cause the processing system to: receive at least one of a web page or an email message comprising displayed content; receive information regarding user interface elements associated with the at least one of the web page or the email message; analyze the information regarding user interface elements, and, content of the at least one of the web page or the email message to determine a logical starting location to begin reading the content; and start to read the content at the determined logical starting location.

The system can further include wherein the information regarding user interface elements associated with the at least one of the web page or email message is received from an application programming interface of a user interface automation system that provides access to user interface elements of at least one of a browser or email application. The system can further include wherein the determination of the logical starting location is further based, at least in part, upon information regarding a reading view associated with the web page or the email message.

The system can further include wherein the reading view comprises a view of the particular web page or email message in which one or more elements determined to be extraneous have been removed. The system can further include wherein the one or more elements determined to be extraneous comprise at least one of an image, a navigation control, or an advertisement. The system can further include wherein analyze the information regarding interface elements and content comprises identifying a first paragraph having less than a predefined quantity of adjacent hyperlinks as the determined logical starting location.

The system can further include wherein analyze the information regarding interface elements and content comprises identifying a first paragraph of content having more than a pre-defined quantity of characters as the determined logical starting location. The system can further include wherein analyze the information regarding interface elements and content comprises identifying a main landmark of the web page as the determined logical starting location. The system can further include wherein analyze the information regarding interface elements and content comprises identifying a heading above a first paragraph having less than a predefined quantity of adjacent hyperlinks as the determined logical starting location.

Described herein is a method of determining a logical starting location to provide content, comprising: receiving at least one of a web page or an email message comprising displayed content; receiving information regarding user interface elements associated with the at least one of the web page or the email message; analyzing the information regarding user interface elements, and, content of the at least one of the web page or the email message to determine a logical starting location to begin reading the content; and starting to read the content at the determined logical starting location.

The method can further include wherein the information regarding user interface elements associated with the at least one of the web page or email message is received from an application programming interface of a user interface automation system that provides access to user interface elements of at least one of a browser or email application. The method can further include wherein determination of the logical starting location is further based, at least in part, upon information regarding a reading view associated with the web page or the email message.

The method can further include wherein the reading view comprises a view of the particular web page or email message in which one or more elements determined to be extraneous have been removed. The method can further include wherein the one or more elements determined to be extraneous comprise at least one of an image, a navigation control, or an advertisement. The method can further include wherein analyzing the information regarding interface elements and content comprises identifying a first paragraph having less than a predefined quantity of adjacent hyperlinks as the determined logical starting location.

The method can further include wherein analyzing the information regarding interface elements and content comprises identifying a first paragraph of content having more than a pre-defined quantity of characters as the determined logical starting location. The method can further include wherein analyzing the information regarding interface elements and content comprises identifying a main landmark of the web page as the determined logical starting location.

Described herein is a computer storage media storing computer-readable instructions that when executed cause a computing device to: receive a web page comprising displayed content; determine information comprising a reading view of at least a portion of the content without displaying the reading view; analyze the determined information comprising the reading view to determine a logical starting point to begin reading the content; and start to read the content of the displayed web page at the determined logical starting point.

The computer storage media can further include wherein the reading view comprises a view of the particular web page or email message in which one or more elements determined to be extraneous have been removed. The computer storage media can further include wherein the one or more elements determined to be extraneous comprise at least one of an image, a navigation control, or an advertisement.

Figure 7:
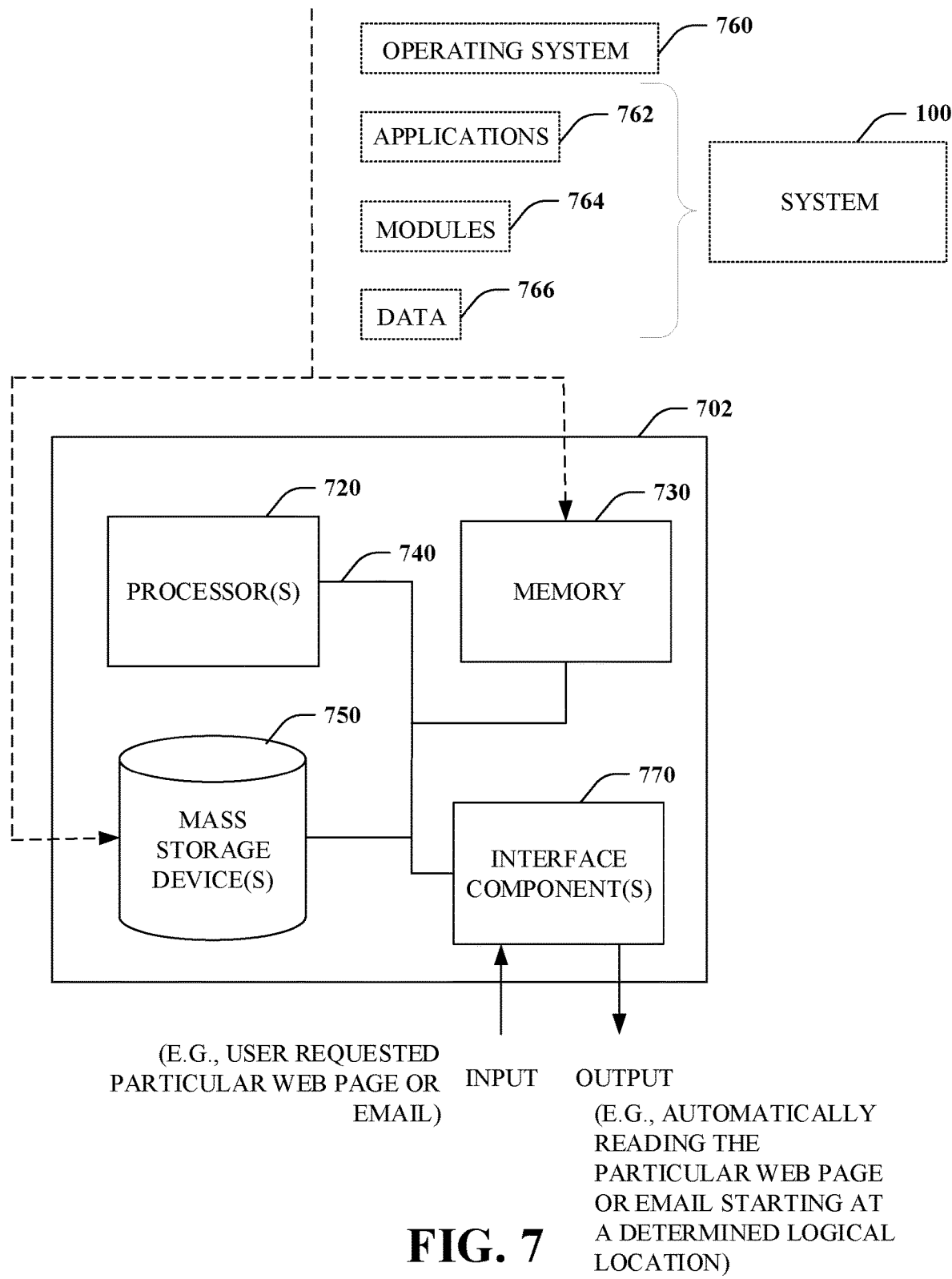
FIG. 7 is a functional block diagram that illustrates an exemplary computing system.

With reference to FIG. 7, illustrated is an example general-purpose computer, processing system or computing device 702 (e.g., mobile phone, desktop, laptop, tablet, watch, server, hand-held, programmable consumer or industrial electronics, set-top box, game system, compute node, etc.). For instance, the computing device 702 may be used in the system 100, the system 200, and/or the system 300.

The computer 702 includes one or more processor(s) 720, memory 730, system bus 740, mass storage device(s) 750, and one or more interface components 770. The system bus 740 communicatively couples at least the above system constituents. However, it is to be appreciated that in its simplest form the computer 702 can include one or more processors 720 coupled to memory 730 that execute various computer executable actions, instructions, and or components stored in memory 730. The instructions may be, for instance, instructions for implementing functionality described as being carried out by one or more components discussed above or instructions for implementing one or more of the methods described above.

The processor(s) 720 can be implemented with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. The processor(s) 720 may also be implemented as a combination of computing devices, for example a combination of a DSP and a microprocessor, a plurality of microprocessors, multi-core processors, one or more microprocessors in conjunction with a DSP core, or any other such configuration. In one embodiment, the processor(s) 720 can be a graphics processor.

The computer 702 can include or otherwise interact with a variety of computer-readable media to facilitate control of the computer 702 to implement one or more aspects of the claimed subject matter. The computer-readable media can be any available media that can be accessed by the computer 702 and includes volatile and nonvolatile media, and removable and non-removable media. Computer-readable media can comprise two distinct and mutually exclusive types, namely computer storage media and communication media.

Computer storage media includes volatile and nonvolatile, removable and non-removable media implemented in any method or technology for storage of information such as computer-readable instructions, data structures, program modules, or other data. Computer storage media includes storage devices such as memory devices (e.g., random access memory (RAM), read-only memory (ROM), electrically erasable programmable read-only memory (EEPROM), etc.), magnetic storage devices (e.g., hard disk, floppy disk, cassettes, tape, etc.), optical disks (e.g., compact disk (CD), digital versatile disk (DVD), etc.), and solid state devices (e.g., solid state drive (SSD), flash memory drive (e.g., card, stick, key drive) etc.), or any other like mediums that store, as opposed to transmit or communicate, the desired information accessible by the computer 702. Accordingly, computer storage media excludes modulated data signals as well as that described with respect to communication media.

Communication media embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Memory 730 and mass storage device(s) 750 are examples of computer-readable storage media. Depending on the exact configuration and type of computing device, memory 730 may be volatile (e.g., RAM), non-volatile (e.g., ROM, flash memory, etc.) or some combination of the two. By way of example, the basic input/output system (BIOS), including basic routines to transfer information between elements within the computer 702, such as during start-up, can be stored in nonvolatile memory, while volatile memory can act as external cache memory to facilitate processing by the processor(s) 720, among other things.

Mass storage device(s) 750 includes removable/non-removable, volatile/non-volatile computer storage media for storage of large amounts of data relative to the memory 730. For example, mass storage device(s) 750 includes, but is not limited to, one or more devices such as a magnetic or optical disk drive, floppy disk drive, flash memory, solid-state drive, or memory stick.

Memory 730 and mass storage device(s) 750 can include, or have stored therein, operating system 760, one or more applications 762, one or more program modules 764, and data 766. The operating system 760 acts to control and allocate resources of the computer 702. Applications 762 include one or both of system and application software and can exploit management of resources by the operating system 760 through program modules 764 and data 766 stored in memory 730 and/or mass storage device (s) 750 to perform one or more actions. Accordingly, applications 762 can turn a general-purpose computer 702 into a specialized machine in accordance with the logic provided thereby.

All or portions of the claimed subject matter can be implemented using standard programming and/or engineering techniques to produce software, firmware, hardware, or any combination thereof to control a computer to realize the disclosed functionality. By way of example and not limitation, system 100 or portions thereof, can be, or form part, of an application 762, and include one or more modules 764 and data 766 stored in memory and/or mass storage device(s) 750 whose functionality can be realized when executed by one or more processor(s) 720.

In some embodiments, the processor(s) 720 can correspond to a system on a chip (SOC) or like architecture including, or in other words integrating, both hardware and software on a single integrated circuit substrate. Here, the processor(s) 720 can include one or more processors as well as memory at least similar to processor(s) 720 and memory 730, among other things. Conventional processors include a minimal amount of hardware and software and rely extensively on external hardware and software. By contrast, an SOC implementation of processor is more powerful, as it embeds hardware and software therein that enable particular functionality with minimal or no reliance on external hardware and software. For example, the system 100 and/or associated functionality can be embedded within hardware in a SOC architecture.

The computer 702 also includes one or more interface components 770 that are communicatively coupled to the system bus 740 and facilitate interaction with the computer 702. By way of example, the interface component 770 can be a port (e.g. serial, parallel, PCMCIA, USB, FireWire, etc.) or an interface card (e.g., sound, video, etc.) or the like. In one example implementation, the interface component 770 can be embodied as a user input/output interface to enable a user to enter commands and information into the computer 702, for instance by way of one or more gestures or voice input, through one or more input devices (e.g., pointing device such as a mouse, trackball, stylus, touch pad, keyboard, microphone, joystick, game pad, satellite dish, scanner, camera, other computer, etc.). In another example implementation, the interface component 770 can be embodied as an output peripheral interface to supply output to displays (e.g., LCD, LED, plasma, etc.), speakers, printers, and/or other computers, among other things. Still further yet, the interface component 770 can be embodied as a network interface to enable communication with other computing devices (not shown), such as over a wired or wireless communications link.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications, and variations that fall within the spirit and scope of the appended claims. Furthermore, to the extent that the term "includes" is used in either the details description or the claims, such term is intended to be inclusive in a manner similar to the term "comprising" as "comprising" is interpreted when employed as a transitional word in a claim.

What is claimed is:

1. A system, comprising: a
processor; and
a memory having computer-executable instructions stored thereupon which, when executed by the processor, cause the system to:
receive a web page or an email message comprising content that is displayable;
receive information regarding user interface elements of the web page or the email message;
analyze the information regarding the user interface elements and the content of the web page or the email message to identify a first paragraph having less than a determined quantity of hyperlinks and designate the first paragraph or a heading above the first paragraph as a logical starting location to begin reading the content; and
by a screen reader, start to read the content at the logical starting location.

2. The system of claim 1, wherein the information regarding the user interface elements of the web page or the email message is received from an application programming interface of a user interface automation system.

3. The system of claim 1, wherein the computer-executable instructions, when executed by the processor, cause the system to:
identify the first paragraph as the logical starting location based, at least in part, upon information regarding a reading view associated with the web page or the email message.

4. The system of claim 3, wherein the reading view comprises a view of the web page or the email message in which one or more elements determined to be extraneous have been removed.

5. The system of claim 4, wherein the one or more elements determined to be extraneous comprise at least one of an image, a navigation control, or an advertisement.

6. The system of claim 1, wherein the computer-executable instructions, when executed by the processor, cause the system to:
select the first paragraph or the heading above the first paragraph as the logical starting location based at least on the first paragraph having less than a predefined quantity of adjacent hyperlinks.

7. The system of claim 1, wherein the computer-executable instructions, when executed by the processor, cause the system to:
select another first paragraph of other content of another web page or another email message as another logical starting location based at least on the another first paragraph having more than a pre-defined quantity of characters; and
start to read the other content at the another logical starting location.

8. The system of claim 1, wherein the logical starting location is the first paragraph.

9. The system of claim 1, wherein the logical starting location is the heading above the first paragraph.

10. A method comprising:
receiving a web page or an email message comprising content that is displayable;
receiving information regarding user interface elements of the web page or the email message;
analyzing the information regarding the user interface elements and the content of the web page or the email message to identify a first paragraph having less than a determined quantity of hyperlinks and selecting the first paragraph or a heading above the first paragraph as a logical starting location to begin reading the content; and
by a screen reader, starting to read the content at the logical starting location.

11. The method of claim 10, wherein the information regarding the user interface elements of the web page or the email message is received from an application programming interface of a user interface automation system that provides access to the user interface elements via at least one of a browser or email application.

12. The method of claim 10, further comprising: determining the logical
starting location based, at least in part, upon information regarding a reading view associated with the web page or the email message.

13. The method of claim 12, wherein the reading view comprises a view of the web page or the email message in which one or more elements determined to be extraneous have been removed.

14. The method of claim 13, wherein the one or more elements determined to be extraneous comprise at least one of an image, a navigation control, or an advertisement.

15. The method of claim 10, wherein analyzing the information regarding the user interface elements and the content comprises identifying the first paragraph based at least on the first paragraph having less than a predefined quantity of adjacent hyperlinks as the logical starting location.

16. The method of claim 10, wherein analyzing the information regarding the user interface elements and the content comprises identifying another first paragraph of content having more than a pre-defined quantity of characters as the another logical starting location at which to start reading other content of another web page or another email message.

17. The method of claim 10, wherein analyzing the information regarding the user interface elements and the content comprises identifying a main landmark of another web page as another logical starting location at which to start reading other content of the another web page.

18. A computer storage media storing computer-readable instructions that, when executed, cause a computing device to:
receive a web page or an email message comprising content that is displayable;
determine information regarding user interface elements of the web page or the email message;
analyze the information regarding the user interface elements and the content of the web page or the email message to identify a first paragraph having less than a determined quantity of hyperlinks and select the first paragraph or a heading above the first paragraph as a logical starting point to begin reading the web page or the email message; and
by a screen reader, start to read the web page or the email message at the logical starting point.

19. The computer storage media of claim 18, wherein the web page or the email message is a particular web page, and the determined quantity of hyperlinks is a predetermined quantity.

20. The computer storage media of claim 18, wherein the first paragraph is identified based at least on the determined quantity of hyperlinks being adjacent in the first paragraph.

* * * * *